US006999966B2

(12) United States Patent
Liang et al.

(10) Patent No.: US 6,999,966 B2
(45) Date of Patent: Feb. 14, 2006

(54) CONTENT MANAGEMENT SYSTEM AND METHODOLOGY FOR IMPLEMENTING A COMPLEX OBJECT USING NESTED/RECURSIVE STRUCTURES

(75) Inventors: Lily L. Liang, San Jose, CA (US); Tawei Hu, San Jose, CA (US); Kenneth C. Nelson, Hollister, CA (US); David M. Choy, Los Altos, CA (US); Khanh M. Le, Austin, TX (US); Edward J. Perry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 10/128,332

(22) Filed: Apr. 23, 2002

(65) Prior Publication Data

US 2003/0204537 A1 Oct. 30, 2003

(51) Int. Cl.
*G06F 17/00* (2006.01)

(52) U.S. Cl. .................. 707/100; 707/101; 715/514
(58) Field of Classification Search ............. 707/1–3, 707/10, 100–102, 104.1, 200; 715/513–514, 715/509
See application file for complete search history.

(56) References Cited

U.S. PATENT DOCUMENTS 4,751,740 A   6/1988   Wright

| | | | |
|---|---|---|---|
| 4,868,733 A | * | 9/1989 | Fujisawa et al. ............... 707/5 |
| 4,969,091 A | | 11/1990 | Muller |
| 5,615,337 A | | 3/1997 | Zimowski et al. |
| 5,644,768 A | | 7/1997 | Periwal et al. |
| 5,742,810 A | | 4/1998 | Ng et al. |

(Continued)

FOREIGN PATENT DOCUMENTS

WO     WO 99/22362     5/1999

OTHER PUBLICATIONS

Jeonghee Kim, Taissok Han, and Suk Kyoon Lee, "Visualization of Path Expression in a Visual Object–Oriented Database Query Language," (2 pages).

Chen–I Lee, Ye–In Chang, and Wei–Pang Yang, "Design Of A New Indexing Organization For A Class–Aggregation Hierarchy in Object–Oriented Databases", Journal of Information Science and Engineering 15, 1999, pp. 217–241, Taiwan.

(Continued)

*Primary Examiner*—Alford W. Kindred
(74) *Attorney, Agent, or Firm*—Hovey Williams LLP (57) ABSTRACT

A content management system is provided including a plurality of tables forming a tree-based storage hierarchy. The system includes a library server having a stored procedure which creates a hierarchical tree-based storage structure having any number of child components horizontally and any number of component types vertically thus specifying a tree topology. Advantageously, a single invocation of the stored procedure will create the specified tree-based data storage structure which is stored in the library server.

18 Claims, 5 Drawing Sheets

U.S. PATENT DOCUMENTS

| | | | |
|---|---|---|---|
| 5,752,243 A * | 5/1998 | Reiter et al. ............. 707/3 |
| 5,774,719 A | 6/1998 | Bowen |
| 5,778,398 A | 7/1998 | Nagashima et al. |
| 5,799,310 A | 8/1998 | Anderson et al. |
| 5,819,252 A | 10/1998 | Benson et al. |
| 5,862,378 A | 1/1999 | Wang et al. |
| 5,875,332 A | 2/1999 | Wang et al. |
| 5,892,902 A | 4/1999 | Clark |
| 5,920,867 A * | 7/1999 | Van Huben et al. ....... 707/101 |
| 5,940,616 A | 8/1999 | Wang |
| 6,012,067 A | 1/2000 | Sarkar |
| 6,016,394 A | 1/2000 | Walker |
| 6,047,291 A | 4/2000 | Anderson et al. |
| 6,055,637 A | 4/2000 | Hudson et al. |
| 6,063,133 A | 5/2000 | Li et al. |
| 6,065,117 A | 5/2000 | White |
| 6,067,414 A | 5/2000 | Wang et al. |
| 6,088,524 A | 7/2000 | Levy et al. |
| 6,104,393 A | 8/2000 | Santos-Gomez |
| 6,128,621 A | 10/2000 | Weisz |
| 6,148,342 A | 11/2000 | Ho |
| 6,161,182 A | 12/2000 | Nadooshan |
| 6,167,405 A | 12/2000 | Rosensteel, Jr. et al. |
| 6,173,400 B1 | 1/2001 | Perlman et al. |
| 6,219,826 B1 | 4/2001 | De Pauw et al. |
| 6,233,586 B1 | 5/2001 | Chang et al. |
| 6,263,313 B1 | 7/2001 | Milsted et al. |
| 6,263,342 B1 | 7/2001 | Chang et al. |
| 6,272,488 B1 | 8/2001 | Chang et al. |
| 6,279,111 B1 | 8/2001 | Jensenworth et al. |
| 6,282,649 B1 | 8/2001 | Lambert et al. |
| 6,289,344 B1 | 9/2001 | Braia et al. |
| 6,289,458 B1 | 9/2001 | Garg et al. |
| 6,292,936 B1 | 9/2001 | Wang |
| 6,308,274 B1 | 10/2001 | Swift |
| 6,314,449 B1 | 11/2001 | Gallagher et al. |
| 6,327,629 B1 | 12/2001 | Wang et al. |
| 6,338,056 B1 | 1/2002 | Dessloch et al. |
| 6,339,777 B1 | 1/2002 | Attaluri et al. |
| 6,343,286 B1 | 1/2002 | Lee et al. |
| 2001/0002486 A1 | 5/2001 | Kocher et al. |
| 2001/0008015 A1 | 7/2001 | Vu et al. |
| 2001/0019614 A1 | 9/2001 | Madoukh |
| 2004/0133848 A1 * | 7/2004 | Hunt et al. ............. 715/500 |

OTHER PUBLICATIONS

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445–452.

Akira Kawaguchi, Daniel Lieuwen, Inderpal Mumick, Kenneth Ross, "Implementing Incremental View Maintenance in Nested Data Models" Database Programming Languages, $6^{th}$ International Workshop, DBPL–6, Aug. 18–20, 1997 Proceedings, pp. 203–221.

Li Tian–Zhu, "Normalization of Nested Structure for Complex Objects" in Chinese, Journal of Software, vol. 9, No. 5, p. 390–396, May 1998, (with English Abstract).

* cited by examiner

CONTENT MANAGEMENT SYSTEM AND METHODOLOGY FOR IMPLEMENTING A COMPLEX OBJECT USING NESTED/RECURSIVE STRUCTURES

FIELD OF THE INVENTION

The disclosures herein relate generally to databases and more particularly to methods and apparatus for storing and accessing information in content management systems.

BACKGROUND

Figure 1A:
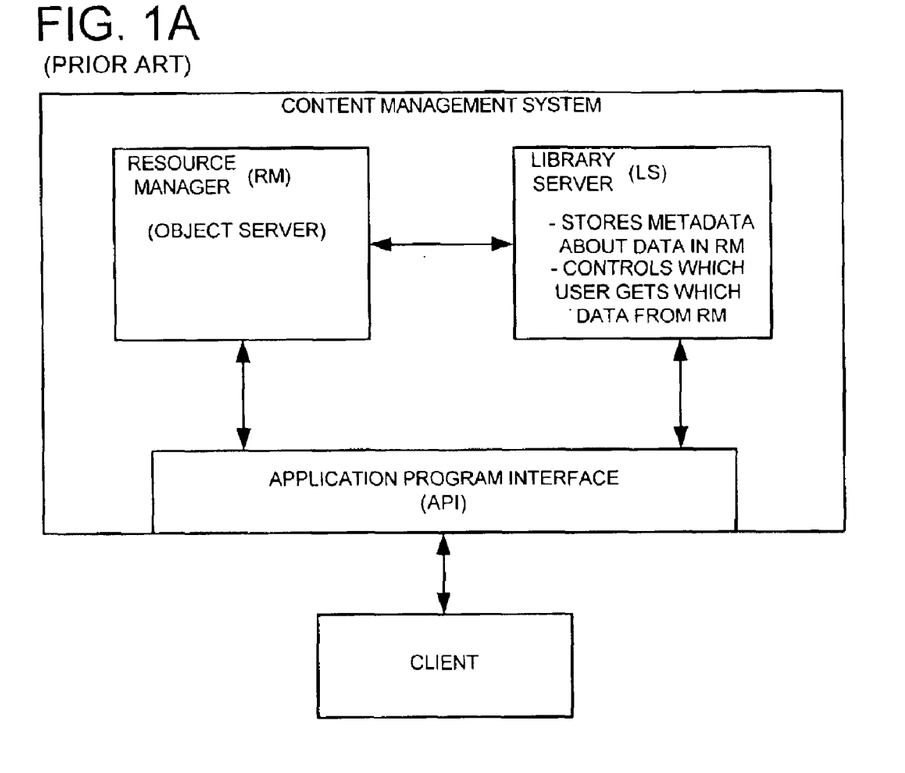
FIG. 1A is a high level block diagram of a conventional content management system showing both server and client.

Conventional content management systems, such as that shown in FIG. 1A, typically include a Library Server (LS), one or more Resource Managers (RMs) and a client access application program interface (API). A client is coupled by a network to the API and seeks information stored in the Resource Manager. The Library Server stores metadata relating to all objects or data stored in the Resource Manager. The Library Server also controls the particular objects that a particular client user can access. Client users can submit requests known as queries through the API to search or retrieve metadata stored in the Library Server or objects stored in the Resource Manager.

Figure 1B:
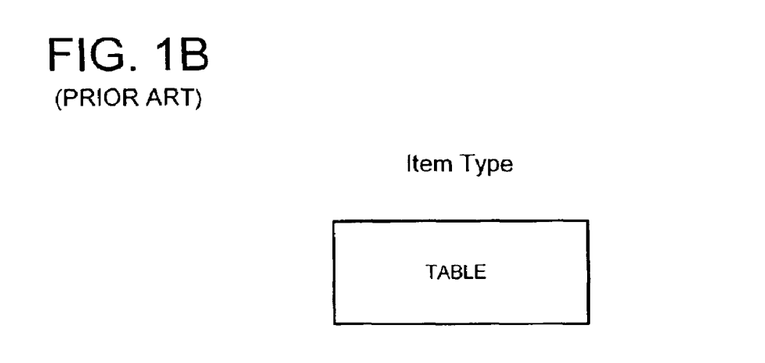
FIG. 1B is a representation of a flat storage data model showing a single storage table.

One approach employed to store items in a content management system is to model an item in a single table. Unfortunately, such a single table approach results in many fields among the rows and columns of the table being unused. Such an approach is inefficient from the storage viewpoint. In the past, flat data models have been used to store data in a content management system. For example, FIG. 1B shows an Item Type which is represented by a single table to form such a flat data storage model.

What is needed is a methodology and apparatus for providing a superior manner of storing and retrieving information in a content management system through the use of improved table structures.

SUMMARY

The disclosure herein involves a content management system which employs a hierarchical item type tree-based structure including tables at different levels to store metadata for items. A principal advantage of the embodiment disclosed herein is the ability to create an item as a complex tree-based hierarchical data structure wherein the number of child table component types horizontally and the number of child table component types vertically are initially unknown. Advantageously, multiple levels of components in a tree-based hierarchical structure for an item may be created by a single application programming interface (API) invocation, as opposed to multiple invocations which require substantially more user effort.

In one embodiment of the disclosed technology, a method is provided for organizing information in a content management system. The system includes a stored procedure which receives a first input that indicates a number of tables to be created horizontally in a tree-based data storage hierarchy. The stored procedure receives a second input which indicates a number of tables to be created vertically in the tree-based data storage hierarchy. The system then creates the specified the tree-based data storage hierarchy including a root table and at least one child table. The tree-based data storage hierarchy thus created includes the number of tables previously indicated horizontally and vertically.

DETAILED DESCRIPTION

Figure 2:
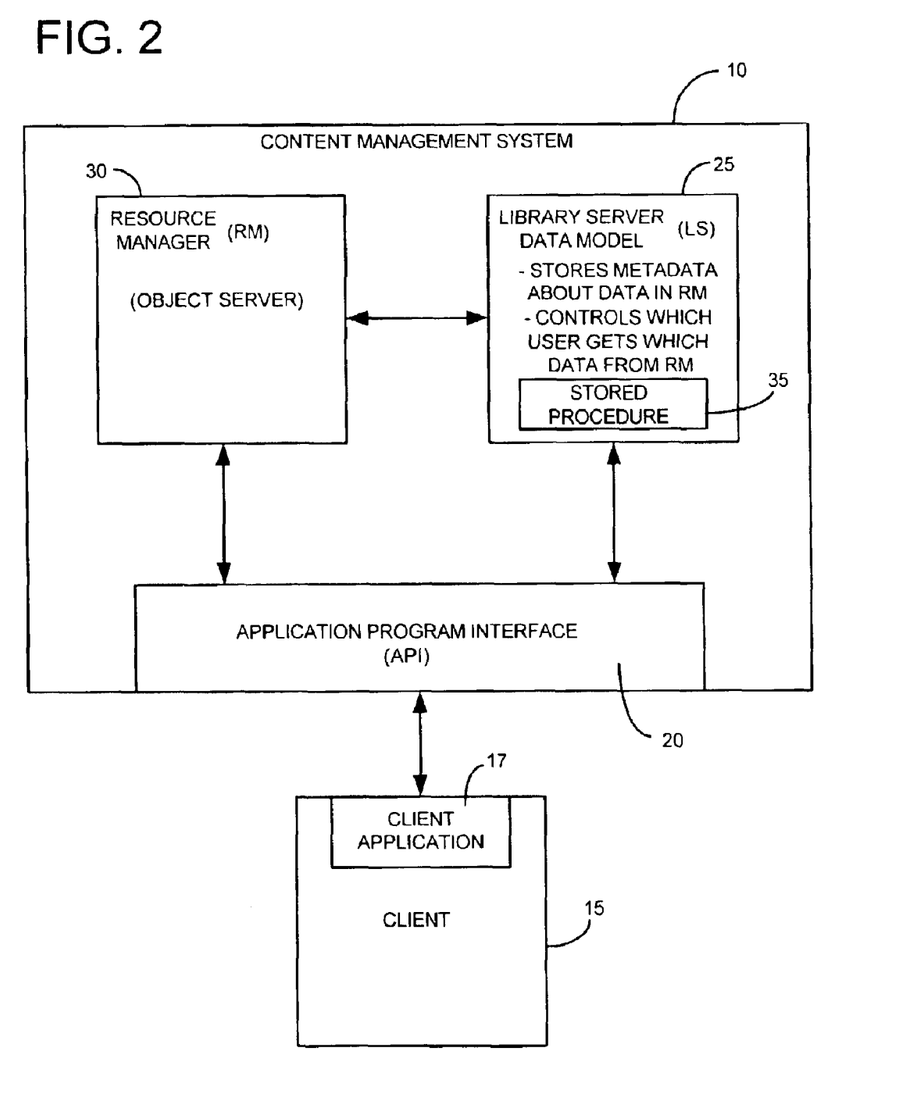
FIG. 2 is a block diagram of one embodiment of the content management system.

FIG. 2 is a block diagram of one embodiment of content management system 10. A client computer 15 including a client application 17 is coupled to content management system 10 via the system's application program interface (API) 20. A library server (LS) 25 is coupled to API 20 and receives queries from client application 17 in client 15. These queries seek information which is stored in library server 25 and/or resource manager 30. Library server 25 is coupled to resource manager 30 and contains metadata concerning the data or objects that are stored in resource manager 30. Many types of data can be stored in resource manager 30, for example, business information, applications, operating systems, text, audio, video and streaming data, just to name a few.

Content management system 10 employs a hierarchical "item type" tree structure including a group of component tables at different levels to store metadata for items. A "Create Tree Hierarchy" stored procedure 35 in library server 25 is used to build a tree-based data storage hierarchy of tables according to input provided by client 15. Significant flexibility is provided to the client user in terms of the number of horizontal child tables or vertical child tables (or levels) for which creation can be requested. A single invocation of this stored procedure will create the entire requested tree hierarchy saving a substantial amount of network communication time.

Figure 3A:
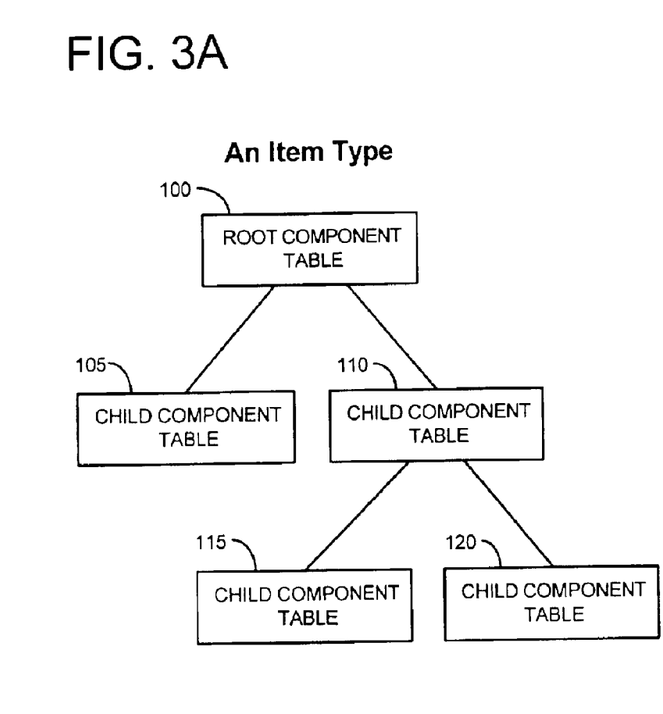
FIG. 3A is a representation of the library server data model employed in the content management system showing the tree-based hierarchy of an "Item Type".
Figure 3B:
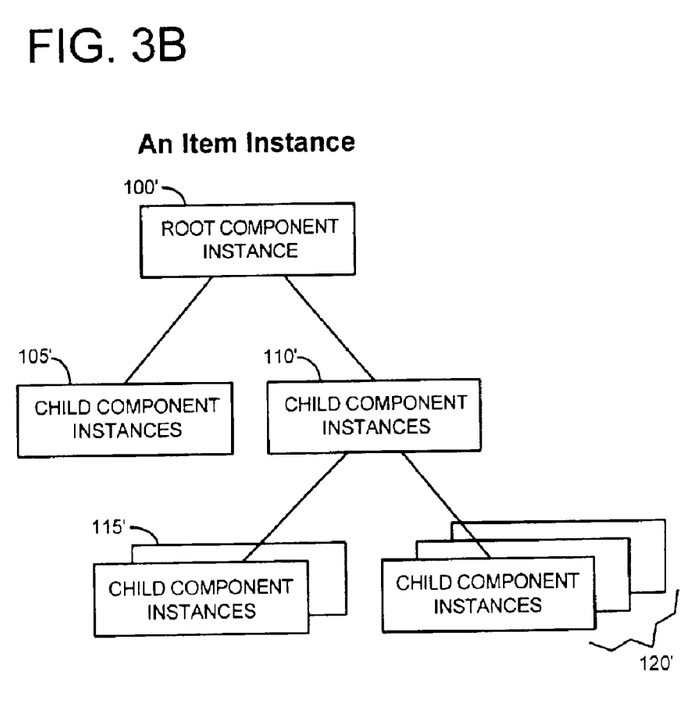
FIG. 3B illustrates the tree hierarchy of an "Item Instance" corresponding to the "Item Type" of FIG. 3A.

The library server data model employed in content management system 10 is shown in FIG. 3A and FIG. 3B. More particularly, FIG. 3A shows the hierarchy of an "Item Type" as including a root component table 100 having two child table component tables 105 and 110. Child component table 110 two child component tables of its own, namely child component tables 115 and 120.

FIG. 3B illustrates an "Item Instance" corresponding to the "Item Type" of FIG. 3A. Root component instance 100' of FIG. 3B is an instance of root component table 100 of FIG. 3A. Likewise, child component instances 105', 110', 115' and 120' are instances of child component tables 105, 110, 115 and 120, respectively.

Figure 4A:
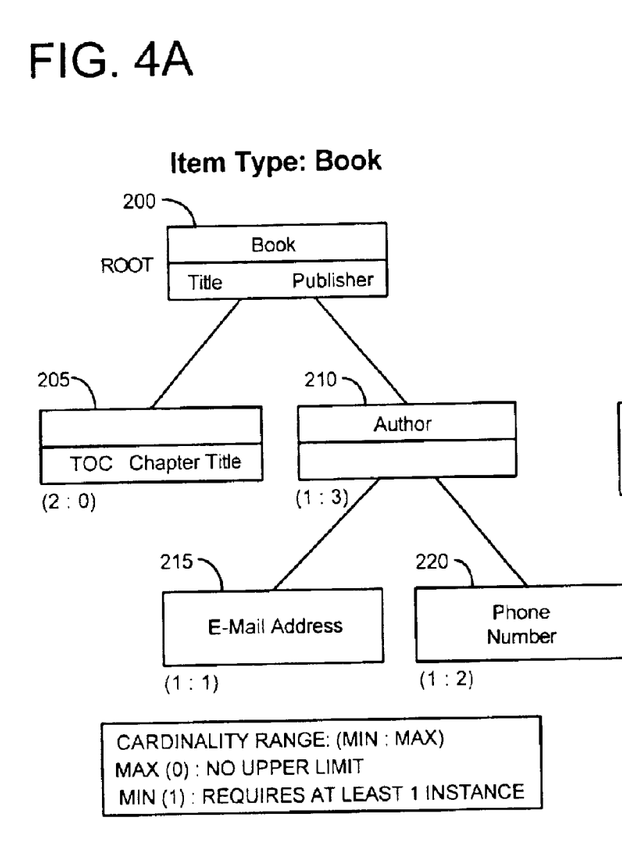
FIG. 4A is a representation of an item type expressed as a tree-based data hierarchy.

FIG. 4A is a representation of an item having one root component table 200 and multiple child component tables dependent therefrom. This item has a cardinality range, namely a minimum and maximum number of rows as will be discussed later in more detail. In this particular example, the Item Type is a Book for which there is both title and publisher information as shown in root component table 200. Root component table 200 is also called Item Type table 200 in FIG. 4A. Under root component table 200 there are two child tables, namely a Table of Contents (TOC)/Chapter Title table 205 and an Author table 210. Dependent on Author table 210 are E-mail Address table 215 and Phone Number table 220. The cardinality range of each of child component tables 205, 210, 215 and 220 is specified adjacent each table in the form (Minimum: Maximum). For example, the cardinality range of Author table 210 is given as (1:3) meaning that this table would have 1 row as a minimum and 3 rows as a maximum. In this manner a minimum of 1 author is required while a maximum of 3 authors is permitted. In other words, Author table 210 would have a minimum of one row and a maximum of 3 rows in this particular embodiment. The cardinality ranges of the remaining child tables 205, 215 and 220 are specified in the same manner. It is noted that if Minimum is sit to 1, then at least one instance or one row is required for the respective table. If Maximum is set to 0, then there is no upper limit on the number of rows the respective table can include. It is noted that Item Type table 200, TOC/Chapter Title table 205, Author table 210, E-Mail Address table 215 and Phone Number table 220 are all component tables for the Item Type "Book".

Figure 4B:
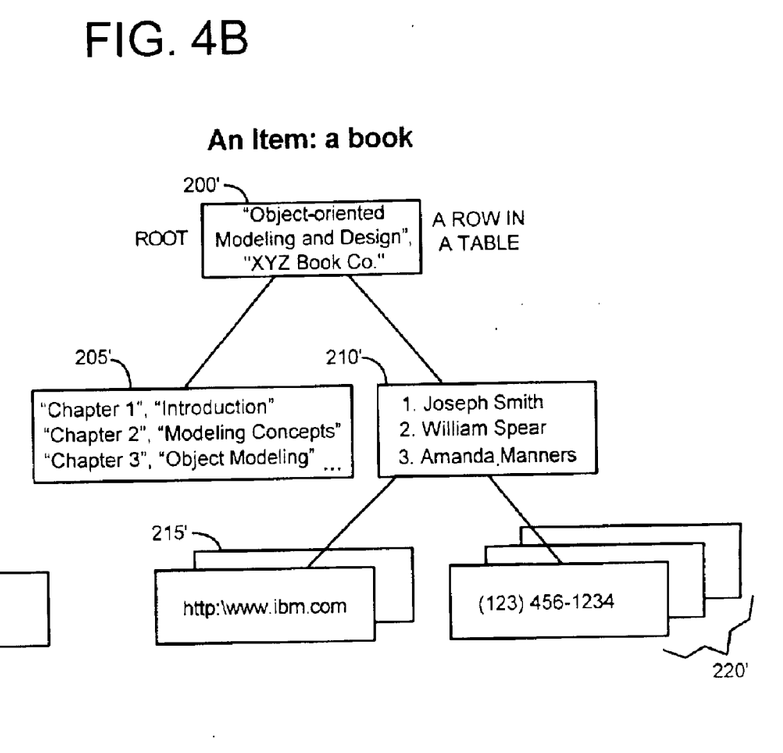
FIG. 4B is a representative instance of the item type of FIG. 4A.

FIG. 4B is a representation of sample instances of the item and component tables of FIG. 4A. In this example, each component table of FIG. 4B corresponds to a respective component table of FIG. 4A. More particularly, the instance for the Item Book in root table 200' is "Object Oriented Modeling and Design", "XYZ Book Co." which is stored as data in one row in this root table. The TOC/Chapter Title table 205' includes 3 instances, namely Chapter 1—Introduction, Chapter 2—Modeling Concepts, and Chapter 3—Object Modeling, each in respective rows. The Author table 210' also includes 3 instances, namely Joseph Smith, William Spear and Amanda Manners in respective rows. E-Mail table 215' includes only one instance in this particular example, namely http:\w3.ibm.com for a particular author. Phone number table 220' includes a sample phone number for a particular author, such as (123) 456-1234, for example as shown.

A tree hierarchy having a number of child component types horizontally and a number of child component types vertically has been described above. A child table may be connected to a parent or root table above by a component ID that points back to the parent or root. Such a component ID is referred to as a foreign key in this tree structure.

To recapitulate, an item in the data model employed in content management system 10 includes a tree-based hierarchical structure of components. The relationship among the components within an item is established by a root component type and zero (or multiple) child component types in the tree structure. In this particular embodiment, each component is implemented by a DB2 relational database table. An item identified by an item ID has its attribute value stored in a root component table and in zero to multiple child component tables. In this embodiment, one and only one root component instance is created at the time the item is created. Child component instances may be required depending on a cardinality range predefined by a system administrator who provides this cardinality range information as input to system 10 from client 15. Each child component may itself be a parent component for other child component instances.

Stored procedure 35 operates in response to client input to create an item of a complex object, namely a tree-based hierarchy in library server 25. Stored procedure 35 allows the creation of a tree structure including any number of child component types in a tree horizontally. Stored procedure 35 also allows the creation of a tree structure including any number of child component types in a tree vertically. The topology of the tree structure is thus specified. Advantageously, stored procedure 35 can achieve creation of the described tree structure in one API invocation.

As a prelude to a later presented flowchart and representative stored procedure source code, it is noted that the disclosed methodology provides nested and recursive data structures starting from the root component. The root component structure includes the attribute values, the number of child types and a pointer to an array of the child type structures. Each child type structure includes the component type ID, the number of component structures in array, as well as a pointer to the array of the child component structures. Each child component structure is an instance of a component and it contains the attribute values, the number of the next level of child types in array and a pointer to the array of the next level of child type structures using a recursive mechanism. When the number of child types is zero, this implies that this component instance is an end node of the tree and processing of the tree structure is complete.

The nested and recursive data structures employed to create an item exhibiting the above described tree-based data hierachry are now discussed with reference to the flow chart of FIG. 5. This flow chart describes the operation of the CreateItem stored procedure 35. The names of the functions, variables and operations in the flow chart are selected to coincide with their individual purposes and functions in C language to facilitate understanding. Process flow starts at block 300 where creation of a hierarchical structure item commences. The system, by the action of stored procedure 35, then gets or fetches the ItemTypeID, the CompTypeID and a RootComponentStruct. It is noted that there is one ComponentStruct in Array.

Process flow then continues to a loop established by block 305 which loops through all ComponentStructs in Array. For each of these ComponentStructs the stored procedure gets the #OfAttributes (i.e. the number of attributes) and AtttributeValueStruct. A row is then inserted into Component Table. The stored procedure then gets or fetches the #OfChildTypes in Array and gets Array of ChildTypeStruct. A determination is then made at decision block 310 to see if the #OfChildTypes has reached zero as we proceed through loop 305. If the #OfChildTypes has reached zero then process flow stops as per block 315 and the creation of the Item with its hierarchical tree structure is now complete. However, if the #OfChildTypes is not zero, then process flow contiuues to another loop 320.

Loop 320 loops through all ChildTypes in Array. Within the ChildType Struct, the stored procedure gets or fetches the CompTypeID, the ParentCompTypeID, the #OfComponentStruct in Array and also fetches Array of ComponentStruct. Process flow then continues back to loop 305 after which the test at block 310 is again conducted. Once the #OfChildTypes=0, process flow stops and creation of the Item in its tree-based hierarchical form is complete.

Figure 5:
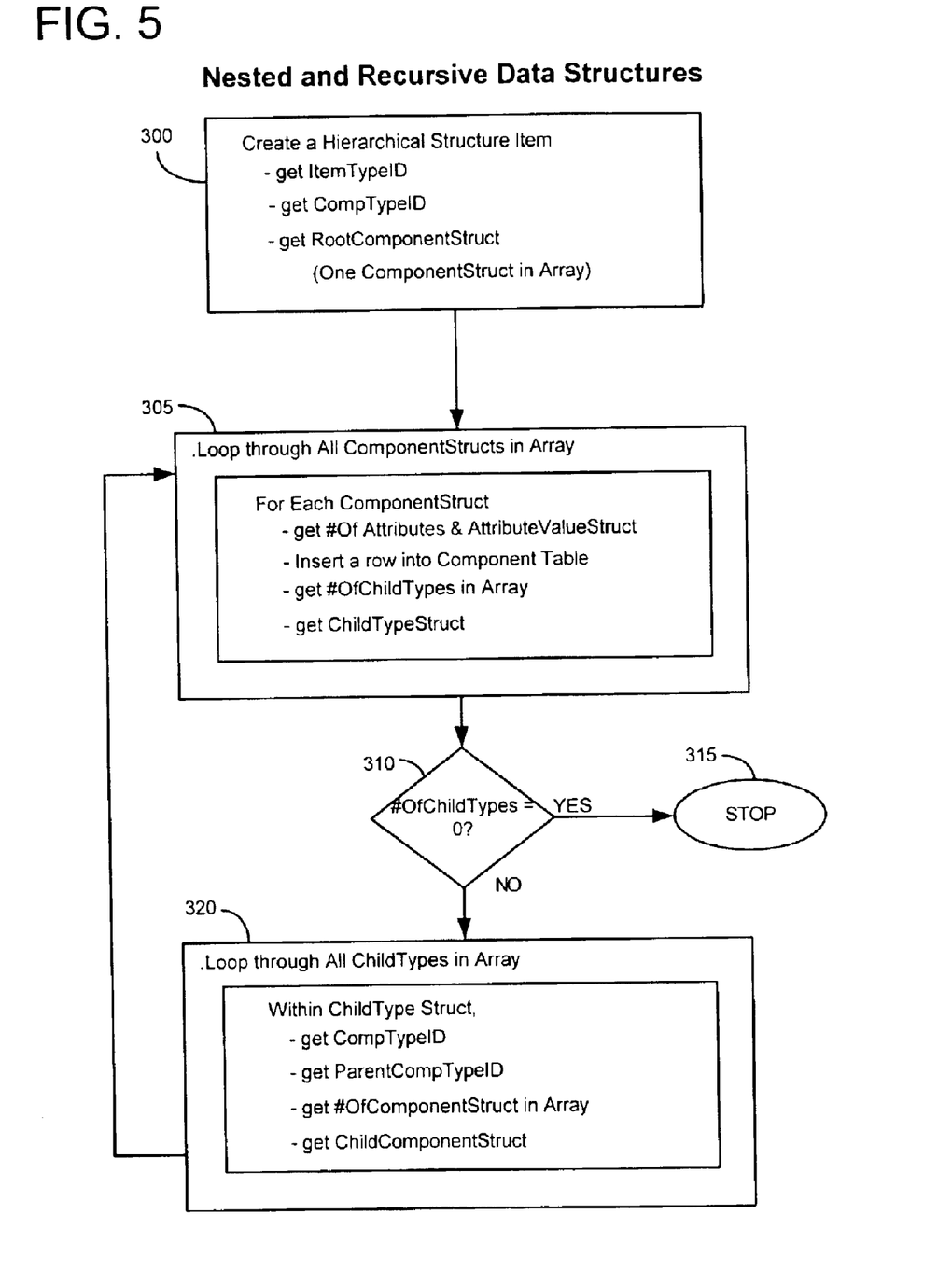
FIG. 5 is a flow chart showing the nested and recursive data structures employed to create the tree-based data hierarchy in the disclosed content management system and methodology.

Representative commented C language source code for performing the operations described generally in the flow chart of FIG. 5 is listed below:

```
/*--------------------------------------*/
/* ICM Create Item Data Structure */
/*--------------------------------------*/
typedef struct __ICMCREATEITEMSTRUCT
{
    long ItemTypeID;       // Item Type identifier
    long CompTypeID;       // Component Type identifier
    ICMCOMPONENT_STRUCT
        * pComponentStruct; // the Root Component Instance data struct
} ICMCREATEITEM_STRUCT;
/*--------------------------------*/
/* Component Structure        */
/*--------------------------------*/
typedef struct __ICMCOMPONENTSTRUCT
{
    char ComponentID      // Component Instance identifier
            [ICM_COMPONENTID_LENGTH+1];
    char ParentComponentID  // Parent Component
    Instance identifier (it is null for Root)
            [ICM_COMPONENTID_LENGTH+1];
    short NumOfAttributes;    // # of Attributes for this
    Component Instance
    ICMATTRIBUTEVALUE_STRUCT
        * pAttributeValueStruct; // an array of
        ICMATTRIBUTEVALUE_STRUCT
    short NumOfChildTypes; //    # of Child Types in array
    ICMCHILDTYPE_STRUCT
        * pChildTypeStruct;     //the array of
        ICMCHILDTYPE_STRUCT
} ICMCOMPONENT_STRUCT;
/*--------------------------------*/
/* Child Type Structure      */
/*--------------------------------*/
typedef struct __ICMCHILDTYPESTRUCT
{
    long CompTypeID;          // Component Type identifier
    long ParentCompTypeID;    // Parent Component Type identifier
    short NumOfComponents;    // # of Component Instances in array
    ICMCOMPONENT_STRUCT
        * pComponentStruct;       //the array of Component Instance
        data struct
} ICMCHILDTYPE_STRUCT;
/*--------------------------------*/
/*   Attribute Value Struct   */
/*--------------------------------*/
typedef struct __ICMATTRIBUTEVALUE_STRUCT
{
    long AttributeID;         // Attribute identifier
    long AttributeLength;   // Attribute Length (for CHAR data type)
    union {                  // Attribute Value
            short sValue;
            long lValue;
            char *pszValue;
            double dValue;
        } AttributeValue;
} ICMATTRIBUTEVALUE_STRUCT;
```

The above nested and recursive data structures are implemented by stored procedure 35 in library server 25 to permit a client application 17 to be able to create a content management system "item" with any number of the component instances in a tree structure hierarchy of component tables horizontally and vertically by a single API invocation. This provides a very significant convenience for the user in constructing a complex tree-based hierarchy for storing data.

From a root component instance or any parent component instances, specifying the number of child types and providing an array of child type structures, library server 25 will loop through the child type structures specified in the array to process the insertion of the component instances into the corresponding component tables. This nested data structure allows any number of child component tables to be processed horizontally.

For each child table, specifying the number of the components to be created and providing an array of component structures, the library server will loop through the number of components, using the attribute values in each structure of the array to create a component instance. Multiple child component instances can be inserted based on the number of components specified for each child type. After each child component is inserted, the next level of child types can be repeated and recursively specified. The implementation of the repetitive and recursive data structures will be able to achieve the creation of any number of the component instances within a child type and any number of next level child types within a component vertically.

The disclosed content management methodology and apparatus advantageously solves the problem of creating a complex tree-based table data hierarchy with horizontal and vertical dimensions by a single invocation of a stored procedure by the client. The content management system can be stored on virtually any computer-readable storage media, such as CD, DVD and other magnetic and optical media in either compressed or non-compressed form. Of course, it can also be stored on a server computer system or other information handling system.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A method of organizing information in a content management system comprising the steps of:
    receiving first input, by a stored procedure in the system, indicating a number of tables to be created horizontally in a tree-based data storage hierarchy;
    receiving second input, by the stored procedure, indicating a number of tables to be created vertically in the tree-based data storage hierarchy; and
    creating the tree-based data storage hierarchy including a root table and at least one child table, the tree-based data storage hierarchy including the number of tables indicated horizontally and vertically in the receiving steps.

2. The method of claim 1 wherein a single invocation of the stored procedure provides both the first input indicating the number of tables to be created horizontally and the second input indicating the number of tables to be created vertically.

3. The method of claim 1 including storing the stored procedure in a library server included in the content management system.

4. A method of organizing information in a content management system comprising the steps of:
    creating tables horizontally in the system by:
        specifying a number of child types from a root component instance or any parent component instance;
        specifying an array of child type structures; and
        looping through the child type structures specified in the array to process the insertion of component instances into component tables, such that any number of child component tables can be processed horizontally.

5. The method of claim 4 further comprising the step of:
creating tables vertically in the system by:
    specifying the number of components to be created for each child component table;

specifying an array of component structures including attribute values; and looping through the array of component structures and using the attribute values in each component structure of the array to create a component instance for each component structure respectively.

6. The method of claim 5 wherein the steps are implemented by a stored procedure.

7. The method of claim 6 wherein the stored procedure is located in a library server within the content management system.

8. The method of claim 6 wherein the stored procedure is implemented in C language.

9. The method of claim 5 wherein the specifying steps include inputting information provided by a client application.

10. A computer program product for organizing information in a content management system, the computer program product including a plurality of computer executable instructions stored on a computer readable medium, wherein the instructions, when executed by the content management system, cause the system to perform the steps of:

receiving first input, by a stored procedure in the system, indicating a number of tables to be created horizontally in a tree-based data storage hierarchy;

receiving second input, by the stored procedure, indicating a number of tables to be created vertically in the tree-based data storage hierarchy; and creating the tree-based data storage hierarchy including a root table and at least one child table, the tree-based data storage hierarchy including the number tables indicated horizontally and vertically in the receiving steps.

11. The computer program product of claim 10 wherein the computer readable medium is an optical disk.

12. The computer program product of claim 10 wherein the computer readable medium is a magnetic disk.

13. A computer program product for organizing information in a content management system, the computer program product including a plurality of computer executable instructions stored on a computer readable medium, wherein the instructions, when executed by the content management system, cause the system to perform the steps of:

creating tables horizontally in the system by:
specifying a number of child types from a root component instance or any parent component instance;
specifying an array of child type structures;
looping through the child type structures specified in the array to process the insertion of component instances into component tables, such that any number of child component tables can be processed horizontally, and creating tables vertically in the system by:
specifying the number of components to be created for each child component table;
specifying an array of component structures including attribute values; and
looping through the array of component structures and using the attribute values in each component structure of the array to create a component instance for each component structure respectively.

14. The computer program product of claim 13 wherein the computer readable medium is an optical disk.

15. The computer program product of claim 13 wherein the computer readable medium is a magnetic disk.

16. A content management system comprising:

a resource manager for storing objects; and a library server, coupled to the resource manager, for storing metadata regarding objects in the resource manager, the library server including a stored procedure for receiving first input indicating a number of tables to be created horizontally in a tree-based data storage hierarchy, the stored procedure receiving a second input indicating a number of tables to be created vertically in the tree-based data storage hierarchy; the stored procedure creating the data storage hierarchy in the library server including a root table and at least one child table, the data storage hierarchy including the number of tables indicated horizontally and vertically.

17. The content management system of claim 16 further comprising an application program interface coupled to the library server and the resource manager.

18. The content management system of claim 17 further comprising a client coupled to the application program interface.

* * * * *